UNITED STATES PATENT OFFICE 2,026,207

METHOD OF MAKING LIGHT WEIGHT POROUS CONCRETE

Erik B. Bjorkman, Montreal, Quebec, Canada

No Drawing. Application May 26, 1933, Serial No. 673,106. In Canada June 1, 1932

3 Claims. (Cl. 49—77.5)

My invention relates to the production of a concrete of exceedingly low cost, which may be advantageously employed in the manufacture of brick, building tiles, slabs and similar products in which low weight combined with high strength and insulation value are desirable qualities.

In carrying my invention into effect, I make use of blast furnace slag, a by-product of the manufacture of pig-iron. As is well known, considerable quantities of slag are formed in the process of smelting iron from the ore, and the disposal of this slag has heretofore generally been an item of expense to the steel industry. Therefore, many attempts have been made to commercially utilize this by-product, especially as an aggregate in the manufacture of concrete. For instance, by letting the molten slag slowly cool and solidify, and by crushing and screening the resulting product an aggregate has been obtained which has found extensive application in concrete manufacture instead of crushed rock or gravel. Concrete made in this manner has approximately the same characteristics as ordinary stone or gravel concrete, i. e. it is substantially non-porous and weighs 140 lbs. or more per cubic foot. Brick and tiles made from this type of concrete will consequently have little insulation value and be very heavy. It has also been suggested to granulate the molten slag in different ways and use the resulting, more or less porous product as aggregate in mixtures with Portland cement or cementitious mixtures of Portland cement and ground granulated slag. Brick and tiles made from such concrete have low weight and good insulating qualities. However, the use of Portland cement as binder means that the cost of such concrete becomes comparatively high.

According to the present invention a concrete of equal or superior qualities may be made from blast furnace slag without the use of Portland cement or similar binding agents. Furthermore, my invention makes it possible to produce at a very low cost a concrete of light weight and high compressive strength, that is in addition exceedingly stable in volume. It is well known in the art that ordinary concrete in which Portland cement is employed as the binding agent has a tendency to shrink during the process of drying. Therefore, cracks will likely appear in walls laid with bricks or other units made from such concrete, unless the units are perfectly dry when built into the wall. In order to insure dryness, as well as complete hardening of the Portland cement the units have to be kept in storage for a considerable period of time, whereby the cost of manufacture is still further increased. It has been found that concrete units made according to the present invention are totally free from shrinkage.

Reference has been made to the fact that one object of this invention is to produce a concrete of light weight. In order to achieve this object it is necessary to make the concrete porous. Porous concrete contains trapped gas-cells which lower its weight and increase its insulating properties. The more porous the concrete is, i. e. the more gas-cells are enclosed, the lower its weight and the higher its insulating value will be.

For this purpose I make use of porous blast furnace slag in carrying my invention into effect. As is well known, blast furnace slag is rendered porous by subjecting the molten slag to the sudden chilling effect of water. Dependent on the manner in which this chilling takes place the appearance and qualities of the resulting product vary greatly. For the purpose of identification of the products of different methods of granulation now in use, I desire to more fully describe what takes place when molten slag is treated with water.

If the stream of slag is allowed to flow in a more or less vertical direction into a pit containing great quantities of water, it will be found that the slag solidifies into highly porous and water absorbent particles having little or no mechanical strength. The size of these particles varies from lumps one inch or more in diameter to exceedingly fine particles. If, on the other hand, the slag is allowed to flow in a slight incline, almost horizontally, onto the surface of the water in the pit, large, highly porous cakes of irregular shape with very little fine particles are formed. The mechanical strength of this type of granulated slag is greater than that of the first type, although the material must still be classified as quite weak. Greater hardness of the particles is obtained if the granulation is carried out in such a manner that a stream of molten slag is poured into a chute in which cold water in great quantities is rapidly flowing. The particles of solidified slag are carried with the stream of water, and will be found upon examination to be very fine and to have considerable mechanical strength. The fineness is such, that practically all of the product passes when dried through an 8 mesh sieve, and more than ¾ of it passes through a 16 mesh sieve.

It should be noted that the changes in physical appearance taking place in the molten slag when it is granulated according to any of the described methods are due entirely to the effect of the water on the molten slag. The solidification of the slag into porous particles is in all three cases caused by the sudden chilling of a solid stream of molten slag by its contact with water of vastly greater volume. The different physical properties of the ensuing products are due to the intensity and duration of this contact. Characteristic for all these products is the fact that they are soaked with water when removed from the granulation pit or chute. The granulated slag I employ in carrying my invention into effect contains comparatively little or no water, when the process of granulation is completed. The granulated slag is made according to a method embodying simultaneous disintegration of the stream of molten slag by mechanical means, and cooling and solidification of the drops of slag thus formed. For this purpose a special machine is employed, in which the granulation takes place. This machine may be constructed in different ways, the main feature of the same being that a hull of iron is provided against which the molten slag is thrown either by means of a blast of compressed air directed against the stream of molten slag, or by means of revolving steel vanes operating in the path of the stream of molten slag, thereby disintegrating the slag and throwing it against the surrounding iron hull. If a blast of air is used for the breaking-up of the slag stream, the chilling action of the air serves to solidify the slag as well. This action may be enhanced by letting the air blast carry with it a spray of water, or steam, and by spraying cold water on the iron hull which is placed in an inclining horizontal position and made to revolve. If revolving vanes are used to effect the disintegration, the slag is chilled by spraying water on the same. The granulate emerging from the latter type of granulating machine contains up to 10% of water, which soon evaporates due to the high temperature of the slag, and the granulate obtained from the former type of granulation machine is dry. By regulating the force of the air blast or the speed of the revolving vanes, and the quantity of water sprayed on the molten slag, I am able to vary the relative sizes of the resulting granules within certain limits. Substantially, however, the granulate emerging from the granulation machine is composed of the following grades of particles:

| Grade | Percent of total by weight | Approximate weight per cubic foot |
|---|---|---|
| | Percent | Pounds |
| Coarser than 2 mesh sieve | 15 | 25 |
| Between 2 and 4 mesh sieve | 25 | 30 |
| Between 4 and 8 mesh sieve | 20 | 40 |
| Finer than 8 mesh sieve | 40 | 60 |

It will be seen that, substantially, more than one half of the material is too coarse to pass through an 8 mesh sieve. At the same time a large percentage of very fine particles is obtained, about 15% of the granulate being too fine to be retained on a 50 mesh sieve. The individual particles have great mechanical strength, although their degree of porosity is high and the volume weight of the material is remarkably low, on an average less than 40 lbs. per cubic foot for the mixed granulate. The particles of slag having a larger diameter than 1/8" are particularly hard and capable of withstanding great pressure before crushing.

Slag granulate thus produced may be employed either directly as it emerges from the granulation machine for the manufacture of concrete according to the present invention, or it may be first subjected to a screening operation for grading into particles of determinate sizes and weights. In fact, I prefer to first divide the granulate by screening into several grades which are transported to separate storage bins. Appropriate quantities of the various grades are then drawn from the bins, water in sufficient quantities added and the moist mass is mixed in a suitable mixer. I have found that by properly grading the granulate I am able to produce a concrete of considerably higher strength and lower weight, than if ungraded granulate is used. The object of these operations is to obtain the largest possible total surface of all the particles in the concrete mass for a given maximum size of the particles, bearing in mind that I also desire to produce a concrete of light weight. In view of the fact that the setting or hardening of the concrete is due to chemical reactions taking place in the very surface of the particles, the necessity of providing the largest possible combined surface of the particles, commensurate with desired low weight and porosity of the concrete, will be appreciated. It is obvious, that a larger total surface is obtained by reducing all the particles to very great fineness, but it will be seen that the porous nature of the granulate will disappear thereby. From the viewpoint of lightness, it is desirable to use as large particles as is possible for practical reasons. However, by using large particles only the total interior surface participating in the setting reactions will be comparatively small, resulting in a weak concrete. Therefore, I prefer to grade the granulate in such a manner that particles of steadily diminishing sizes are present in the mix, the relative quantities of the different sizes being so determined that all voids between larger particles are filled with smaller ones. It will be appreciated, that the volume weight of the concrete will under such circumstances—all other conditions being equal—depend on the size of the largest particles in the mix. The larger diameter the biggest particles have, the lighter the concrete will be. There is, however, a practical limit for the size of the largest particles which is determined by the thickness of the webs or walls of the hollow building units for which the concrete is to be used. In most cases I have found this limit to be 5/8".

It will now be apparent, that the use of the granulate obtained by pouring a stream of molten slag into a larger and more powerful stream of cold water, as previously described, will result in a comparatively heavy concrete, inasmuch as the granulate thus obtained is so fine that practically all of it passes through an 8 mesh sieve. Numerous practical tests have shown that concrete made according to this invention from such granulate will have approximately 25% heavier weight without having greater compressive strength, compared with concrete made in the same manner from granulate obtained from the granulation machine, as described, and graded to contain particles varying in size from 5/8" down to impalpable dust.

The granulate having been graded and reapportioned as described, the next step in the manufacture of concrete according to this invention has to do with the formation of desired articles of manufacture, such as hollow or solid building blocks, brick, etc., from the moistened mass.

Although the sudden chilling of the molten slag renders it hydraulically active to some extent, it will be found that if an ordinary stamping or pressing machine, such as is now commonly used in the manufacture of building blocks and similar products from mixes of Portland cement, aggregate and water, is used for the formation of blocks from the graded granulate, the resulting products will have little or no strength even after a long period of time. The granulate will simply act as any porous aggregate, and it would be necessary to add Portland cement in sufficient quantities in order to obtain desired strength. This is not the object of the present invention, however, as I desire to eliminate the use of Portland cement, which in products of this kind constitutes the major item of cost. For this purpose I press or stamp the products I desire to make in a specially constructed machine, capable of exerting great pressure on the mass. The pressure exerted by stamping machines commonly used at present for the production of ordinary concrete units generally does not exceed 500 lbs. per square inch, whereas I have found it necessary to subject the mass of granulate to a pressure of not less than 1500 lbs. per square inch in order to obtain satisfactory hardening of the concrete. By consolidating the granulate at such high pressure an exceedingly intimate contact is created between the surfaces of adjoining particles, which is a necessary condition for satisfactory hardening of the concrete, by reason of the fact that a granulate produced by sudden chilling of molten blast furnace slag is hydraulically active in the presence of water only to a very limited extent. Unless there is an actual contact between the surfaces of the different particles, bonding between the particles fails to take place, as no special bonding agent with great hydraulic activity, such as Portland cement in ordinary concrete, is present in the mix.

I have found that the hydraulic qualities of the granulate are greater, the more basic the slag is. Therefore, blast furnace slags in which the basic constituents, i. e. lime and magnesia, predominate over the acidic constituents, i. e. silica, iron oxide and alumina, are most suitable for the manufacture of concrete according to this invention. However, I have found that also less basic or even acidic slags may be advantageously used, as the slags may be activated hydraulically by introducing free bases into the mix. Any free base commercially available at low cost, such as for instance sodium hydroxide or calcium hydrate or a mixture of these, may be employed for this purpose. The introduction of these ingredients into the mix may be done in the process of granulation, by spraying the molten slag with a solution of the bases in water, instead of using pure water. I may also add the bases to the mass while mixing it with water. When the base is calcium hydrate, I may add finely ground quicklime. The quicklime reacts with the water in the granulate under formation of calcium hydrate. This reaction is facilitated by leading steam into the mixing apparatus. I have found that very small quantities of free bases are required to render even quite acidic slags sufficiently active hydraulically. In no case has it been found necessary to add more than 5% of calcium hydrate by weight of the slag. Generally less than 2% is required. When sodium hydroxide is used, generally less than 1% by weight of the slag is needed.

Consolidated concrete made as described has a weight of from 80 lbs. per cubic foot upwards, dependent on the size of the largest particles and the degree of consolidation employed. It is obvious, that there is a practical limit for the pressure to which the granulate may be subjected and still remain porous, determined by the strength of the porous particles. If the consolidation is carried beyond this limit, the porous particles will break down and become crushed to a fine powder. The resulting concrete will then be heavy and possess very little strength. I have found that the greatest pressure to which granulate, produced in the granulation machine as described and graded to contain particles ranging from ⅝" in diameter to very fine dust, may be subjected without crushing is around 5000 lbs. per square inch. Concrete made by consolidating the granulate to this pressure has a weight of approximately 105 lbs. per cubic foot. For the manufacture of loadbearing building blocks it is quite unnecessary to employ such high pressure, however, as satisfactory strength is obtained if the granulate is consolidated under a pressure of from 2000 to 3000 lbs. per square inch. The volume weight of such concrete is around 90 lbs. per cubic foot.

Granulate made by pouring a stream of molten slag into a pit containing large quantities of water is so weak and friable, that crushing commences at a pressure of less than 500 lbs. per square inch, whereby it will be seen that such granulate is not suitable for the manufacture of concrete according to this invention.

Having formed the concrete into building units, as described, I now proceed to cure the same. I have found that bonding between the surfaces of the different particles commences to take place immediately after the granulate is consolidated, provided moisture is present. The bond thus created becomes increasingly strong in the course of time. After a period of 28 days in a moist atmosphere, the concrete will have sufficient strength for practical purposes. I have found, however, that the chemical reactions in the concrete which cause the hardening of the same are tremendously accelerated, if the concrete is subjected to the effect of steam at high pressure for a short time. As a matter of fact, if the concrete is kept for 6 to 8 hours in a curing chamber, in which a steam pressure of from 100 to 150 lbs. per square inch is maintained, its strength will be considerably higher at the end of this period than if it were kept in a moist curing room at normal temperature for a period of several months.

In practice I prefer for this reason to employ high pressure curing of the concrete. Immediately after having been formed in the stamping or pressing machine, the concrete units are removed to suitable curing cylinders of steel, adapted to be closed after the concrete units are introduced therein so as to permit steam pressure to develop within the cylinders. Steam is now introduced in the cylinders, and a pressure preferably in the neighbourhood of 125 to 150 lbs. per square inch is maintained in the cylinders for a period of 6 to 10 hours. Upon completion of the curing the steam is let off, and the concrete units are removed into the open air. Owing to the fact that the temperature of the units at the moment of their removal from the curing cylinders is considerably higher than the boiling temperature of water at atmospheric pressure, surplus moisture evaporates at once, and the concrete units are ready for immediate use.

The compressive strength and insulation value of concrete made in accordance with this invention are, as pointed out, dependent on the volume weight of the same. At the same time, for a given granulate having particles of determinate sizes, the volume weight is directly related to the degree of consolidation. Therefore, it is possible to produce a concrete of greatly varying qualities simply by varying the pressure at which the granulate is consolidated. The heavier this pressure is (up to the limit of resistance of the particles themselves), the heavier, stronger and less water-absorbent the concrete becomes. Concrete consolidated at a comparatively low pressure becomes lighter and more insulating than the heavier grades. For instance, concrete weighing 90 lbs. per cubic foot and made from granulate containing particles of a maximum size of ⅝" has a compressive strength of about 2200 lbs. per square inch, when cured in steam at high pressure. When it is consolidated to weigh 95 lbs. per cubic foot, the concrete has a compressive strength exceeding 2700 lbs. per square inch, the conditions of manufacture being otherwise equal.

Owing to the porous nature of the granulate particles, concrete made as described has valuable heat and sound insulating qualities; its water absorption is low enough to comply with the standard requirements of the American Concrete Institute, and it has the capacity of retaining ordinary nails driven into it. It can also be sawed and cut with ordinary wood-working tools. Furthermore, such concrete is exceedingly stable in volume. Numerous tests have proved that no shrinkage occurs during the process of drying the concrete. Consequently, there is no danger of shrinkage cracks in walls laid with units made from this concrete.

Moreover, such units present a very pleasing appearance, the colour of the same being almost white. For this reason, when used for the construction of interior walls, the units may be left uncovered, whereby the cost of plastering the walls is eliminated.

Having thus described my invention, what I claim is:—

1. The herein described method of making preformed concrete of higher compressive strength than 1400 pounds per square inch and lower density than substantially 110 pounds per cubic foot which comprises mechanically disintegrating a stream of molten blast furnace slag into drops of molten slag and solidifying and cooling the drops without quenching in water to produce a granulate consisting substantially of hard porous particles capable of developing hydraulic activity on the surface, adding water to said particles, consolidating the moist mass of slag particles under a pressure in excess of 1500 pounds per square inch under formation of concrete units of desired shape, releasing the pressure on the concrete units immediately thereafter, and thereupon curing said consolidated concrete units.

2. The herein described method of making preformed concrete of higher compressive strength than 1400 pounds per square inch and lower density than substantially 110 pounds per cubic foot which comprises mechanically disintegrating a stream of molten blast furnace slag into drops of molten slag and solidifying and cooling the drops without quenching in water to produce a granulate consisting substantially of hard porous particles capable of developing hydraulic activity on the surface, separating said granulate into grades of particles of determinate and desired sizes, remixing said grades of particles in determinate and desired proportions, adding water, consolidating the moist mass of slag particles under a pressure in excess of 1500 pounds per square inch under formation of concrete units of desired shape, releasing the pressure on the concrete units immediately thereafter, thereupon curing said consolidated concrete units in steam of high temperature, and finally releasing the steam to cause moisture to evaporate immediately.

3. The herein described method of making preformed concrete of higher compressive strength than 1400 pounds per square inch and lower density than substantially 110 pounds per cubic foot which comprises mechanically disintegrating a stream of molten blast furnace slag into drops of molten slag and solidifying and cooling the drops without quenching in water to produce a granulate consisting substantially of hard porous particles capable of developing hydraulic activity on the surface, separating said granulate into grades of particles of determinate and desired sizes, remixing said grades of particles in determinate and desired proportions, adding water containing free bases, consolidating the moist mass of slag particles under a pressure in excess of 1500 pounds per square inch under formation of concrete units of desired shape, releasing the pressure on the concrete units immediately thereafter, thereupon curing said consolidated concrete units in steam of high temperature, and finally releasing the steam to cause moisture to evaporate immediately.

ERIK B. BJORKMAN.